June 23, 1970   A. N. CHESTER ET AL   3,517,246

MULTI-LAYERED, STAGGERED APERTURE TARGET

Filed Nov. 29, 1967   2 Sheets-Sheet 1

INVENTORS A. N. CHESTER
M. H. CROWELL
BY Wilford L. Wisner
ATTORNEY

3,517,246
MULTI-LAYERED STAGGERED APERTURE TARGET
Arthur N. Chester, Murray Hill, and Merton H. Crowell, Morristown, N.J., assignors to Bell Telephone Laboratories, Incorporated, Murray Hill and Berkeley Heights, N.J., a corporation of New York
Filed Nov. 29, 1967, Ser. No. 686,529
Int. Cl. H01j 31/40, 31/60; H01i 31/28
U.S. Cl. 313—66                                 4 Claims

ABSTRACT OF THE DISCLOSURE

An electron-beam-scanned information storage device is disclosed in which lateral electrical and thermal conduction between staggered arrays of apertures is employed. These devices include camera tubes and scan converters, in either of which continuous film arrangements or diode arrays can be used.

BACKGROUND OF THE INVENTION

This invention relates to electron-beam-scanned information storage devices such as camera tubes and scan converters. In a scan converter, the information is written by one electron beam and is read at a different rate or a different time by another electron beam. In a camera tube, a pattern of incident light writes the stored information.

In the prior art, the storage materials used in such devices are characterized by resistivities of such a magnitude that the storage time is shorter than may frequently be desired. Accordingly, various schemes have heretofore been proposed for increasing the effective resistivity by employing lateral conduction through the storage material, e.g., a photoconductor, between staggered arrays of apertures. The lateral conduction enables the storage time constants to be more easily selected.

Nevertheless, the bandwidth of radiation to which such a device is responsive is not as broad, throughout the visible and infrared portions of the spectrum, as would be desirable. While it is known that thermal response of a material can be more broadband than its photoconductive response, arrangements for employing the thermal response have heretofore required arrangements in which the storage time constants were relatively difficult to control. This problem may be more easily appreciated if one considers that, to obtain thermal response in a typical semiconductor, an extremely thin layer must be employed. The heat capacity of such a layer is not great; and its thermal conductivity usually will cause the storage time constants to be smaller than desired.

SUMMARY OF THE INVENTION

According to our invention, we have recognized that the storage time constants of a device employing a thermally responsive material can be readily controlled by suitable lateral conduction arrangements. By using the term lateral conduction in this context, we refer not only to the electrical conduction but also to the thermal conduction. In particular, the broadband characteristics of thermally responsive structures are obtained in a multi-layered, staggered-apertured target that provides lateral electrical and thermal conduction through a semiconductor sufficiently thin that the conduction is thermally responsive. Electrical and thermal insulation are provided between the apertures by material that is, nonetheless, transparent in order to admit the writing information. The thermal response is caused to occur in an image-like pattern of discrete areas that provide temporary information storage. The thermal time constant, which is essentially the storage time constant, is selected by the length and configuration of the lateral conduction paths.

In specific embodiments, insulating islands or apertured insulating layers can provide the staggered-apertured effect; or mesa diodes backed by an appropriately waffled substrate can likewise provide the staggered-aperture effect.

BRIEF DESCRIPTION OF THE DRAWING

Further features and advantages of our invention will become apparent from the following detailed description, taken together with the drawing, in which:

In FIG. 1, the configuration as a whole is similar to that of an ordinary television camera tube. The camera tube includes a cathode 11, deflection yokes 13, suitable apertures, accelerating, focusing, and collimating electrodes as shown, a transparent face plate 16, and a target 11 which in this particular case includes the face plate 16 for structural support. Electrons secondarily emitted from the target 11 are collected by a grid 14 which is suitably positively biased by a DC source 15 with respect to the target substrate. The output load resistor 17 is connected to the target substrate and biased with respect to cathode 11 by a DC voltage source 18; and the signal across resistor 17 is AC-coupled to the output by coupling capacitors 19. The features of our invention reside primarily in the target 11, of which greater detail is shown in the cross-sectional view of FIG. 2.

Figure 3:
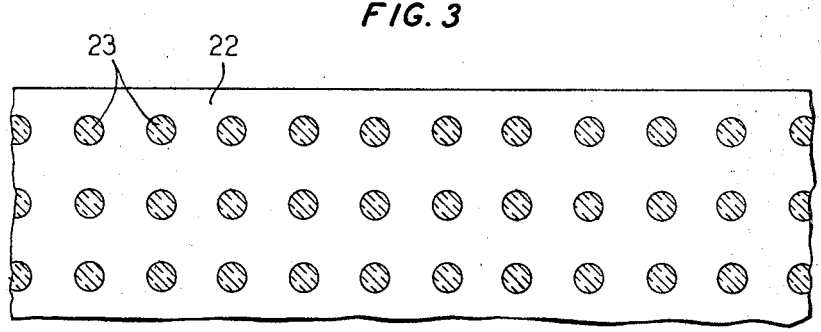
FIGS. 3 and 4 are sectional views of FIG. 2.

The face plate 16 serves as a transparent insulator and support for the target. Deposited on the face plate 16 is a transparent electrode 21, illustratively tin oxide, that forms a continuous conducting film over the surface of face plate 16. Next, to form a two-dimensional array of information storage locations, over electrode 21 there is deposited an insulating coating 22, illustratively silicon dioxide; and a regularly spaced array of apertures is provided therein through which an overlying thermally responsive semiconductive layer 23 contacts electrode 21. The appearance of the apertures in coating 22 can be seen most easily in Section 3—3 as shown in FIG. 3. The apertures are illustratively 8 microns in diameter and have a center-to-center spacing of about 20 microns. The thermally responsive layer 23 is illustratively antimony trisulfide. Other possible materials include silicon and cadmium sulfide.

The surface of contact between electrode 21, on the one hand, and layer 23 and coating 22, on the other, is a first surface of the information storage array. The other surface of layer 23 is the second surface of the array.

Figure 4:
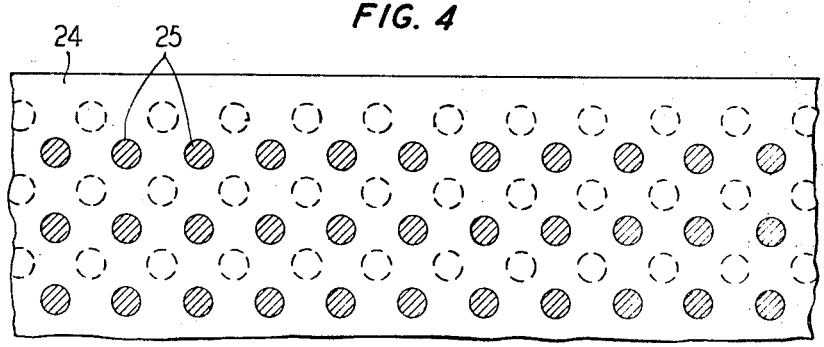

Over the thermally responsive layer 23, there is deposited a second insulating coating 24, which has apertures that are staggered with respect to the apertures in coating 22. Coating 24 is also illustratively silicon dioxide; and the size and spacing of its apertures are similar to those of coating 22, that is, 8 microns in diameter and 20 microns center-to-center. They have a staggered disposition with respect to the apertures in coating 22. The staggered arrangement of apertures of coatings 22 and 24 may be most easily perceived from a view of Section 4—4, as shown in FIG. 4. The apertures in coating 24 are shown with solid lines; and the apertures in coating 22 are shown with dotted lines. In FIG. 4, the stagger is illustratively accomplished in two dimensions simultaneously, although staggering the apertures in one dimension only would be sufficient. The amount of the lateral displacement is 10 microns, one-half of the center-to-center spacing.

Deposited in the apertures in the coating 24 and extending over the edges of the apertures are the conductive caps 25, which provide conductive reading access to the target 11. Illustratively, the electrons from the scanning reading electron beam are collected by the conductive caps 25. Moreover, the conductive caps 25 may be a thin layer of gold-black in order to increase the thermal absorption capability of the target. Gold-black is a finely-divided form or an irregular vapor-deposited form of gold. It is so highly absorbing that it appears black to the eye. For want of a better generic term, it will be called a substantially amorphous absorber.

Figure 5:
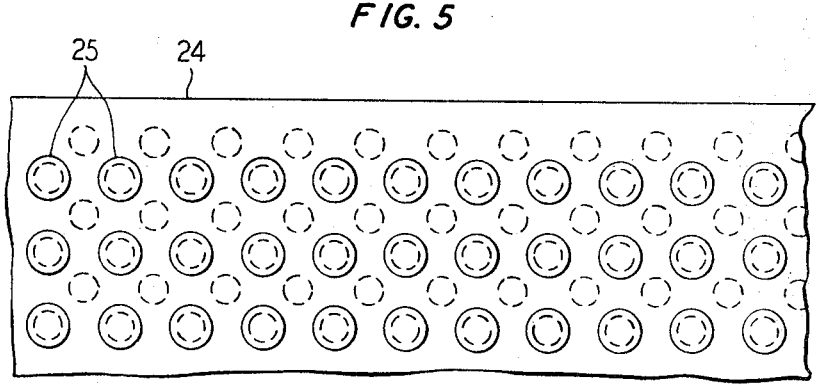
FIG. 5 is a plan view of the target of FIG. 2.

Thus, the caps 25 are both collectors of electrons and collectors of the thermal energy, insofar as it passes through the remainder of the target to reach the caps 25. A plan view of the completed target with caps 25 deposited therein is shown in FIG. 5 with the underlying apertures shown dotted in order to clarify the relative disposition of the parts. Caps with square-shaped tops might also be used, since more of the oxide could be covered.

The antimony trisulfide thermally responsive layer 23 illustratively measures 1 micron thick at the thinnest dimension between insulating coatings 22 and 24. Illustratively, the coatings 22 and 24 are 0.5 micron thick.

Maximum thermal sensitivity is attained by making layer 23 as thin as possible because reducing its heat capacity will tend to increase its temperature rise due to the incident radiation or electron beam. Desirable values of thickness of layers 22, 23, and 24 lie in the range 0.01 to 5 microns. Thus, these layers may be more than an order of magnitude (a factor of ten) thinner than would be used in a conventional photoconductive vidicon-type structure.

If it is desirable to obtain particular values of thermal and electrical time constant, these requirements will affect the choice of material properties and layer thickness. The electrical time constant (for the decay of charge deposited on conductive caps 25), $T_{el}$, is $$T_{el} = \rho \epsilon a^2 / (dt) \quad (1)$$

in which $\rho$ is the electrical resistivity of layer 23, $\epsilon$ is the dielectric constant (in MKS units) of layer 22, $d$ is the thickness of layer 23, $t$ is the thickness of layer 22, and $a$ is the average length of the conductive path for electric current passing through layer 23, approximately equal to the distance between an aperture in layer 22 and a nearby aperture in layer 24.

The thermal time constant is approximately given by $$T_{th} = c_p \rho_M dt / k \quad (2)$$

in which $d$ and $t$ have been previously defined, $c_p$ is the specific heat at constant pressure of layer 23, $\rho_M$ is the mass density of layer 23, and $k$ is the thermal conductivity of layer 22.

In operation in the embodiment of FIG. 1, target 11 behaves as follows. The information to be stored is formed as an optical image, typically infrared, upon transparent face plate 16 (illustratively by a lens, not shown). The major portion of the incident radiation passes through transparent electrode 21 and through transparent coating 22 and is absorbed both in the thermally responsive layer 23 and in the gold-black conductive caps 25. The silicon dioxide in coatings 22 and 24 is not appreciably thermally responsive to the incident radiation. The response of layer 23 is such that the temperature rises at various locations in direct proportion to the intensity of the incident infrared energy. Superimposed on this relatively smooth or analog-type variation, is a discrete pattern of hot spots produced by the thermally responsive gold-black conductive caps 25. These discrete areas of thermal response will tend to heighten the resolution in the thermal image.

Reading of the stored information pattern by the scanning electron beam is enabled because the electrical conductivity of layer 23 is increased when there is an increase in the temperature of the portion of the layer 23 through which conduction must occur. Assume, for example, that the reading electron beam strikes a particular cap 25. The resulting current passes from the cap 25 into layer 23 and splits into predominantly four portions in order to reach the substrate electrode 21 through the nearest apertures in coating 22. One output pulse of current is obtained through resistor 17 which is dependent upon the previous intensity of illumination in that region of the target. Similarly, as the reading electron beam strikes each succeeding cap 25, an output pulse of current is produced which is correspondingly dependent upon the original illumination of the target in that region.

In the event that the information is written into the target by an energetic electron beam, as in a scan converter, rather than by a light beam, the thermal pattern is still similarly dependent upon the excitation energy in each local region.

If a longer thermal time constant is desired, the target 11 is simply fabricated with a somewhat thicker layer 23, at least in the portions not protruding into the apertures of coating 22. It can also be increased by reducing the size of the apertures in either or both of coatings 22 and 24, since a corresponding increase in conduction path length will result.

Another advantage of our invention resides in the substantially broader spectral bandwidth obtained, as compared to photoconductive-type structures. Our analysis shows that the response of the specific embodiment of FIG. 1 should be fairly flat from at least 25 microns in the infrared to 0.2 micron in the ultraviolet. In addition, all writing beam electrons of energy sufficient to penetrate the supporting structure and enter either layer 23 or caps 25 will be effective to produce thermal excitation of the layer 23. The response curve will be substantially flat with respect to writing electron energy.

Figure 1:
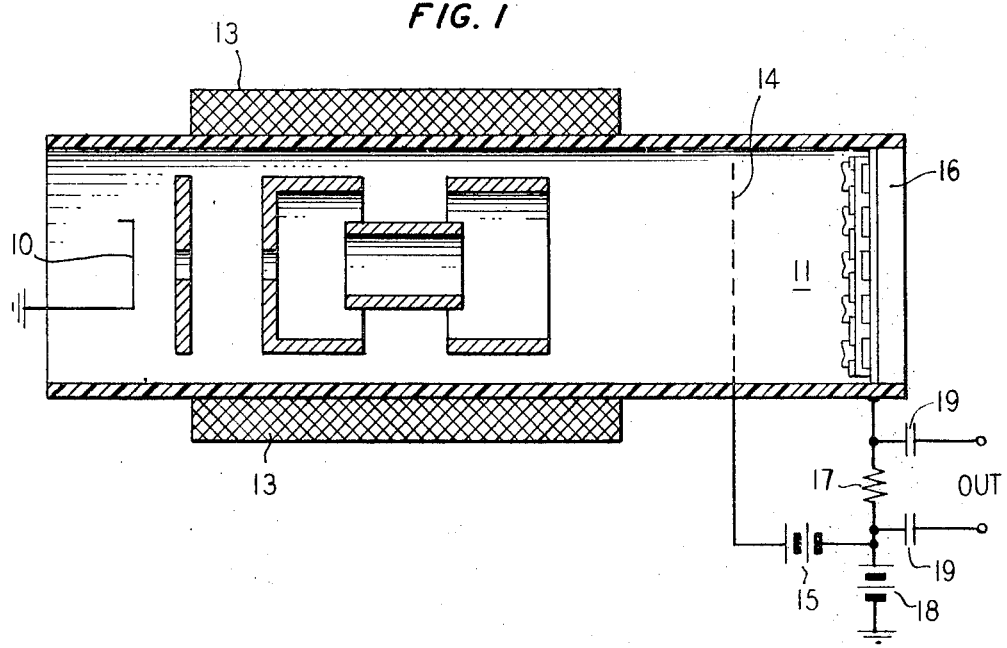
FIG. 1 is a partially pictorial and partially schematic illustration of a first embodiment of the invention employed in a camera tube of the electron-beam-scanned type.
Figure 2:
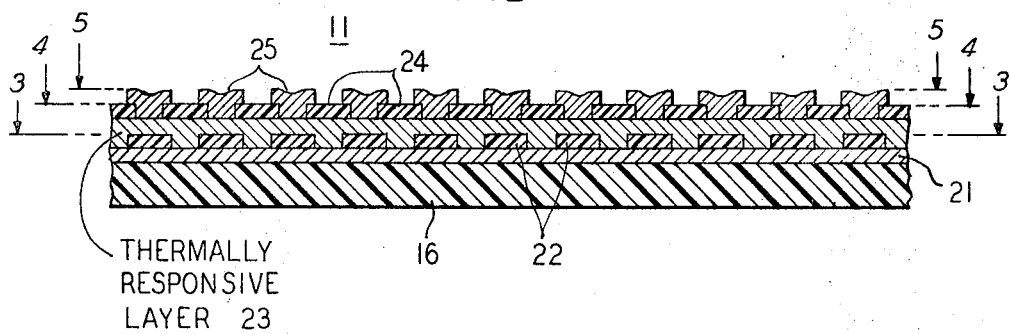
FIG. 2 is a cross-sectional view of a portion of the target of FIG. 1.

It should also be noted the writing energy may be directed upon the target 11 from either side, even though it is illustratively incident through face plate 16 in FIG. 1. Light will pass, at least partially, through the substantially transparent coatings 22 and 24; but energetic electrons will pass only through caps 25, for one direction of incidence, or through face plate 16 and partially through electrode 21, for the other direction of incidence. It may be readily appreciated, however, that a writing electron beam can be much more efficiently used if incident upon target 11 from the same side as the reading electron beam. Electron beam tube structures for directing two beams on the same side of a target are well known.

Figure 6:
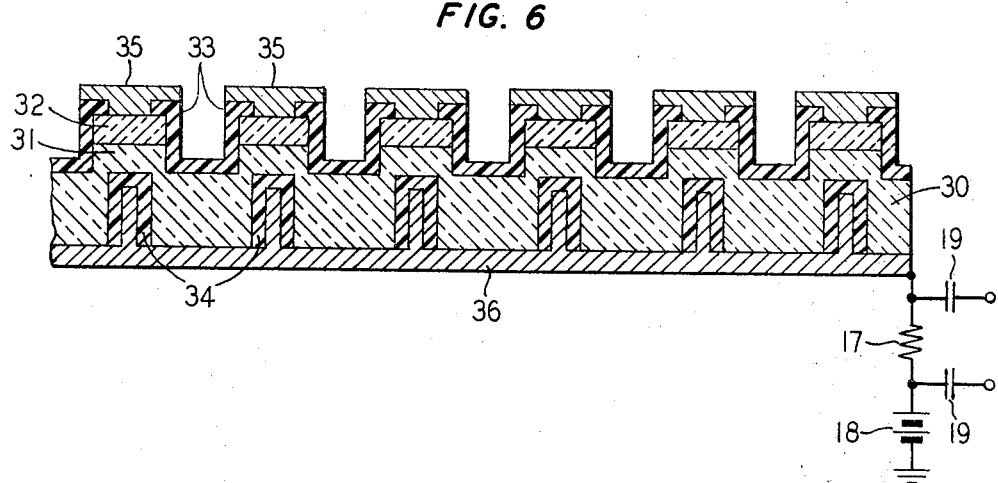
FIG. 6 is a partially pictorial and partially schematic illustration of a second embodiment of the invention employing mesa diodes backed by a waffled substrate.

A more discrete thermal storage pattern, and potentially longer storage time constants, can be achieved in a diode array target structure, such as illustrated in FIG. 6.

In FIG. 6, the supporting substrate 30 is illustratively an n-type silicon wafer. The wafer is etched by conventional photolithographic techniques, or by a suitable laser beam, to produce the n-type pedestal 31 for a regular rectangular array of mesa diodes. The p-type regions 32 of the diodes may be formed by epitaxial growth upon the pedestals 31, or may be formed by diffusion after the insulating coating 33 has been formed on the edges and sides of the pedestals. Specifically, the diffusion would occur through apertures provided in the insulating coating 33. Coating 33 may be formed by appropriate heating of the wafer in a furnace. The apertures would then be formed by etching by conventional photolithographic techniques. The optional conductive caps 35 are electrolytically deposited, in the apertures and over the edges of coating 33.

The substrate 30 is waffiled to produce a regular array of holes intruding into the back surface of the wafer and disposed below the centers of the junctions formed between pedestals 31 and p-regions 32. These holes are illustratively drilled by a laser that employes $Nd^{3+}$ ions in a yttrium aluminum garnet (YAG) host, operating at 1.06 microns. For further details of such hole-drilling techniques, see the article by M. I. Cohen in the Bell Laboratories Record, volume 45, page 264, September 1967. Individual oxide coatings 34 are grown within the holes in substrate 30 by appropriate heating of the wafer in a furnace. The conductive electrode 36 is then deposited on the back surface of wafer 30.

Illustrative parameters for the embodiment of FIG. 6 are as follows. The diameter of each mesa diode is illustratively about 8 microns and their center-to-center spacing is about 20 microns. The impurity concentration of substrate 30 is illustratively $10^{18}$ to $10^{21}$ atoms per cubic centimeter, illustratively phosphorous diffused into the wafer 30 as originally formed. The dopant impurity in p-regions 32 is illustratively boron having a concentration of $10^{18}$ to $10^{21}$ atoms per cubic centimeter. The thickness of the p-regions 32 is illustratively 0.5 to 1.0 micron. The silicon dioxide coatings 33 and 34 are illustratively grown to a thickness of 0.5 micron, the diameter of the holes in the back surface of the substrate 30 being about 6 microns.

The material of the conductive caps 35 is chosen to have a low reflectively in the spectral range of interest to maximize the amount of energy absorbed. In addition, this material should have a higher reflectivity in the spectral region outside the detecting spectrum to maximize the temperature rise caused by the absorbed energy. For example, platinum-black, which may be electrolytically deposited, is useful as an absorber in the ultraviolet and visible portion of the spectrum and provides a high value of reflectivity in the infrared. Typical thickness of the caps would be 0.1 to 1.0 micron. Platinum-black has a structure similar to that of gold-black and will also be called amorphous for purposes of this application.

The electrode 36 is illustratively vacuum deposited tin oxide, which is substantially transparent to the light wavelengths of interest.

In operation, the embodiment of FIG. 6 performs similarly to the embodiment of FIG. 1 in the respect that the incident excitation energy is partially absorbed in the substrate 30 and in the diodes and in the platinum-black caps 35. The absorbed energy, because of the thinness of the substrate 30 directly beneath the diode junctions, produces a temperature rise which is directly related to the intensity of the incident energy. In this embodiment, as in the embodiment of FIG. 1, the platinum-black caps 35 tend to concentrate the thermal energy over discrete areas in response to excitation energy drawn from somewhat wider areas. The lateral thermal conduction between the information storage sites, that is, the individual diodes, is made to have a time constant of a desired value because of the high thermal impedance resulting from the thin necks at the bases of the diodes as formed by the substrate holes of the waffled structure and the relatively great thermal path lengths. The silicon dioxide coatings 33 and 34 are not good thermal conductors.

When the reading electron beam strikes one of the platinum-black caps 35, a current flows therefrom toward the junction of regions 31 and 32 and produces a capacitive charging pulse of current across the diode junction in response to the incident electron beam. The junction capacitance is charged because the electron flow reverse-biases the junctions. The next succeeding thermal excitation of that storage site by the incident light, or by an energetic writing electron beam, produces a temperature rise which partially discharges the reverse bias of the diode acquired during reading and establishes a condition requiring an amount of recharging from the reading current pulse that is directly related to the incident light or writing electron beam energy. Thus, the information storage occurs in a thermally responsive pattern of partially discharging of reverse bias of the diode junctions. The pattern of partial discharging corresponds to the pattern of the incident thermal excitation energy. The next pulse of reading electron beam current recharges the junction capacitance and is coupled through the substrate 30 around the edges of the corresponding oxide insulating coating 34 to the electrode 36 to appear as an output pulse across load resistor 17. Therefore, the output signal is directly proportional to the incident energy pattern.

We claim:

1. An information storage device having a target capable of storing information received from radiation incident on the target and an electron beam forming means arranged to scan the target to detect localized variations in the electron conductivity of the target caused by the incident radiation, said target comprising a support layer, a continuous conductive readout electrode covering the support layer, a first insulating layer covering the readout electrode except for apertures forming an array, a thermally responsive layer formed on the insulating layer so as to cover the insulating layer and to extend into the said apertures and into contact with the readout electrode to form a first array of conductive regions, said thermally responsive layer comprising a material in which electron conduction is thermally sensitive, a second insulating layer covering the thermally responsive layer except for apertures within which are disposed a second array of conductive regions so positioned to permit scanning thereof by the electron beam, and the conductive regions of the first and second arrays being offset with respect to each other in the direction of scan so that the path of electron travel and thermal conduction between conductive regions on opposite sides of the target is partly lateral.

2. The device of claim 1 wherein the transverse thickness between conductive regions of the first and second arrays is of the order of the wavelength of the incident radiation, such wavelengths varying from 25 microns in the infrared to 0.2 micron in the ultraviolet.

3. The device of claim 1 wherein the conductive regions on the side of the target exposed to the electron beam are covered with heat-absorbing, black-body coatings so as to intensify the response of the thermally responsive regions.

4. An information storage device according to claim 1 in which the thermally responsive layer is a crystalline semiconductor wafer waffled on both sides to give a complementary cross section, the intruding portions of the waffle on both sides of the wafer having insulating coatings, the waffled structure being covered on one side with a continuous conductive layer contacting only the protruding portions thereof so as to form the first array of conductive regions, and the waffled structure on the other side having p-n junctions formed in the protruding portions thereof to form thermally responsive diodes and conductive layers deposited over each protruding region to form the second array of conductive regions.

References Cited

UNITED STATES PATENTS

| | | | |
|---|---|---|---|
| 2,415,842 | 2/1947 | Oliver | 313—66 |
| 2,786,880 | 3/1957 | McKay | 313—68 X |
| 2,886,739 | 5/1959 | Matthews et al. | 313—68 X |
| 2,980,813 | 4/1961 | Garbuny | 313—65 |
| 3,082,340 | 3/1963 | Schneeberger. | |
| 3,324,327 | 6/1967 | Koda | 313—66 |
| 3,409,797 | 11/1968 | Ross | 313—66 X |

FOREIGN PATENTS

| | | |
|---|---|---|
| 901,572 | 1/1954 | Germany. |
| 1,009,828 | 6/1952 | France. |

ROBERT SEGAL, Primary Examiner

U.S. Cl. X.R.

313—101, 329